United States Patent
Camphous

[19]

[11] Patent Number: 5,873,253

[45] Date of Patent: Feb. 23, 1999

[54] METHOD AND APPARATUS FOR COOLING PARTS THAT ARE BEING WORKED

[76] Inventor: Catherine M. Camphous, 22936 Gaukler, Saint Clair Shores, Mich. 48080

[21] Appl. No.: 834,764

[22] Filed: Apr. 3, 1997

[51] Int. Cl.[6] ........................................................ F25D 25/00
[52] U.S. Cl. ............................................................. 62/62
[58] Field of Search .................................. 62/62, 99, 320, 62/336, 430, 434, 436, DIG. 16; 165/168

[56] References Cited

U.S. PATENT DOCUMENTS

| | | | |
|---|---|---|---|
| 2,837,180 | 6/1958 | Armstrong | 62/62 |
| 3,556,201 | 1/1971 | Sander | 165/2 |
| 3,571,978 | 3/1971 | Day et al. . | |
| 3,748,866 | 7/1973 | Heider et al. | 62/99 |
| 4,346,754 | 8/1982 | Imig et al. | 374/46 |
| 4,450,652 | 5/1984 | Walsh . | |
| 4,513,538 | 4/1985 | Wolters et al. . | |
| 4,948,936 | 8/1990 | Landry | 219/76.14 |
| 4,967,832 | 11/1990 | Porter | 165/104.32 |
| 5,127,196 | 7/1992 | Morimoto et al. . | |
| 5,197,537 | 3/1993 | Chigira et al. | 165/32 |
| 5,388,635 | 2/1995 | Gruber et al. | 165/80.4 |
| 5,628,197 | 5/1997 | Rada | 62/62 |

FOREIGN PATENT DOCUMENTS 28436  1/1989  Japan ................................ 62/DIG. 2

*Primary Examiner*—William Doerrler
*Attorney, Agent, or Firm*—Reising, Ethington, Learman & McCulloch, PLLC

[57] ABSTRACT

An apparatus for removing heat energy from a work piece comprises a copper plate having a support surface for holding a work piece during cutting or grinding operations. A pump propels cooling fluid, such as antifreeze, through a fluid delivery hose and into a channel formed in the copper plate, adjacent the support surface. After passing through the channel, the fluid passes out of the copper plate through an exit port and along a fluid return hose to a cooler. The cooler cools the fluid as the fluid circulates back to the pump along the fluid delivery hose. The pump returns the cooling fluid to the copper plate.

12 Claims, 2 Drawing Sheets

METHOD AND APPARATUS FOR COOLING PARTS THAT ARE BEING WORKED

TECHNICAL FIELD

This invention relates generally to a method and apparatus for using a fluid coolant to cool parts that are being worked.

BACKGROUND OF THE INVENTION

A cooling system for removing heat energy from a part being worked, i.e., a "work piece," must be able to remove a sufficient amount of heat energy from the work piece to prevent heat-related damage to the work piece. Heat-related damage includes partial or complete melting of portions of the work piece resulting in plastic deformation. Another form of heat-related damage results when excessive heat distorts the work piece or the tool by causing portions of the work piece or the tool to physically expand in size. When portions of the work piece or tool expand in this way it can make it extremely difficult to adjust cutting tolerances to compensate for the material expansion especially when the work piece or tool comprise materials with different thermal expansion coefficients.

Current systems that cool work pieces typically employ a lubricant fluid bath. Such fluid baths control heat build-up in a work piece by reducing the friction generated between a cutting element, such as a grinding surface, a drill, a lathe or a saw, and the work piece. Fluid baths also dissipate heat by convective heat transfer, i.e., by absorbing heat energy and carrying it away from the work piece.

Fluid baths of this type also carry away fragments of the work piece—fragments that have separated from the work piece in the process of being worked. The fluid must, therefore, be filtered to remove these fragments. In addition, work pieces that have been worked while being cooled by such a bath must, in most cases, be cleaned to remove the cooling fluid before the finished parts can be put to their intended use. Properly reclaiming, disposing of and otherwise accounting for fluids used in these cooling bath systems in an environmentally responsible manner can be difficult, expensive and time-consuming.

At least one fluid bath-type cooling system avoids the problem of filtering fragments by circulating cooling fluid within the work piece itself. U.S. Pat. No. 4,513,538 issued to Wolters et al. on Apr. 30, 1985 discloses a cooling system in an apparatus for superfinishing thin-wall metal work pieces. With this system a fluid coolant directly contacts a surface of a work piece, i.e., an interior surface directly opposite the work piece surface being machined.

Another type of system that has been disclosed for cooling work pieces circulates a fluid coolant through the tool that works the work piece. Because tools of this type typically must move in relation to supporting machine elements, it can be difficult, time consuming and expensive to design, construct and maintain systems that circulate fluid in and out of such tools without leakage.

An example of a system that circulates fluid through a tool is disclosed in U.S. Pat. No. 5,127,196 issued to Morimoto et al. on Jul. 7, 1992. The cooling system disclosed in this patent is used in an -apparatus for planarizing a dielectric formed over a semiconductor substrate. A fluid coolant is circulated in and out of a machining tool in the form of a hollow grinding table. The fluid cools an abrasive upper surface of the grinding table from within the table. The table rotates in relation to the semiconductor substrate and its abrasive upper surface grinds the dielectric-coated face of the substrate.

Another example of such a system is disclosed in U.S. Pat. No. 4,450,652 issued to Walsh on May 29, 1984. The Walsh patent discloses a cooling system for an apparatus that polishes semiconductor wafers. Similar to the Morimoto et al. patent, this system passes cooling fluid through a grinding tool in the form of a turntable with an upper abrasive surface for grinding wafers.

U.S. Pat. No. 3,571,978 issued to Day et al. on Mar. 23, 1971 discloses a lapping machine having a lapping tool in the form of a hollow pressure plate through which a cooling fluid is circulated. The work to be lapped is placed between the pressure plate and a lapping table.

What is needed is a system that cools work pieces without wetting any surface of the work piece and without including a fluid coolant circulation system within the work piece or the tool that works the work piece.

SUMMARY OF THE INVENTION

In accordance with this invention an apparatus is provided that removes heat energy from a work piece by circulating a cooled fluid within a work piece support member. The support member has a work piece support surface to hold a work piece. A fluid passageway is disposed adjacent the work piece support surface. A fluid is disposed in the fluid passageway. A fluid propeller is disposed adjacent the passageway and in operative engagement with the fluid to move the fluid through the passageway. A cooler is disposed adjacent the fluid passageway and is in thermal communication with the fluid to remove heat energy from the fluid. The fluid passageway includes a channel disposed within the support member adjacent the work piece support surface. The channel directs the fluid through the support member and adjacent the work piece to transfer heat energy from the support member into the fluid by convection. The heat energy transfers into the support member from a work piece fixed to the work piece support surface by conduction.

According to another aspect of the invention, the support member comprises a metal plate having a fluid inlet port and a fluid outlet port. The channel extends through the plate between the fluid inlet port and the fluid outlet port.

According to another aspect of the invention, the channel is defined by a void formed within the plate.

According to another aspect of the invention, the void comprises intersecting bores.

According to another aspect of the invention, the plate comprises a copper block.

According to another aspect of the invention, the fluid passageway forms a circuit and the fluid propeller causes the fluid to circulate through the circuit.

According to another aspect of the invention, the fluid circuit comprises a fluid delivery hose connected between the cooler and the intake port and a fluid return hose connected between the fluid outlet port and the cooler.

According to another aspect of the invention, the fluid comprises anti-freeze.

According to another aspect of the invention, the apparatus includes at least one additional support member. Each of the additional support members includes a work piece support surface to hold at least one additional work piece. A channel is disposed adjacent each of the additional work piece support surfaces. Each channel is in fluid communication with a fluid junction disposed adjacent and in thermal communication with the cooler.

According to another aspect of the invention, the fluid passageway comprises at least one additional circuit for each additional support member. Each of the additional support members is in fluid communication with the fluid junction through one of the additional fluid circuits.

According to another aspect of the invention, a method is provided for removing thermal energy from a work piece using the apparatus defined above. According to this method, a fluid channel portion of the fluid passageway in the support member is provided adjacent the work piece support surface. A work piece is supported on the work piece support surface of the support member. A fluid propeller is provided adjacent the passageway and in operative engagement with the fluid to move the fluid through the channel. A cooler is provided adjacent the passageway and in thermal communication with the fluid to remove thermal energy from the fluid.

According to another aspect of the invention, a method is provided for removing thermal energy from more than one work piece at a time. According to this method fluid channel portions of the fluid passageway are presented in each support member adjacent each work piece support surface. A work piece is supported on each work piece support surface of the support member. A fluid propeller is provided adjacent the passageway and in operative engagement with the fluid to move the fluid through at least one of the channels. A cooler is provided in thermal communication with the fluid to remove thermal energy from the fluid.

BRIEF DESCRIPTION OF THE DRAWINGS

To better understand and appreciate the invention, refer to the following detailed description in connection with the accompanying drawings.

DETAILED DESCRIPTION OF THE PREFERRED EMBODIMENT

Figure 3:
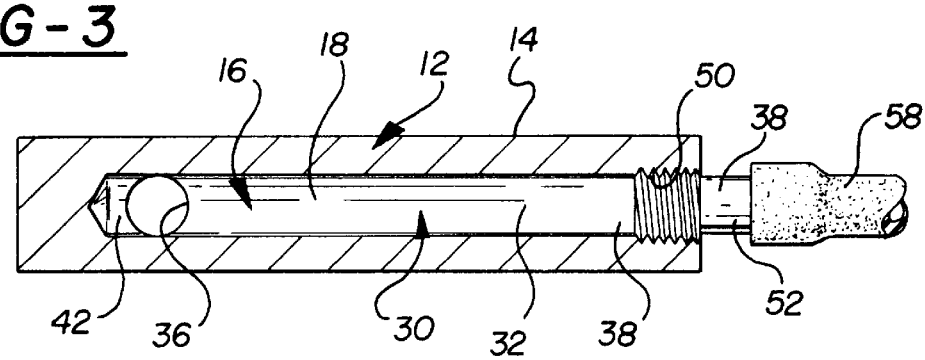
FIG. 3 is a cross-sectional view of the plate of FIG. 1 taken along line 3—3 of FIG. 1.
Figure 4:
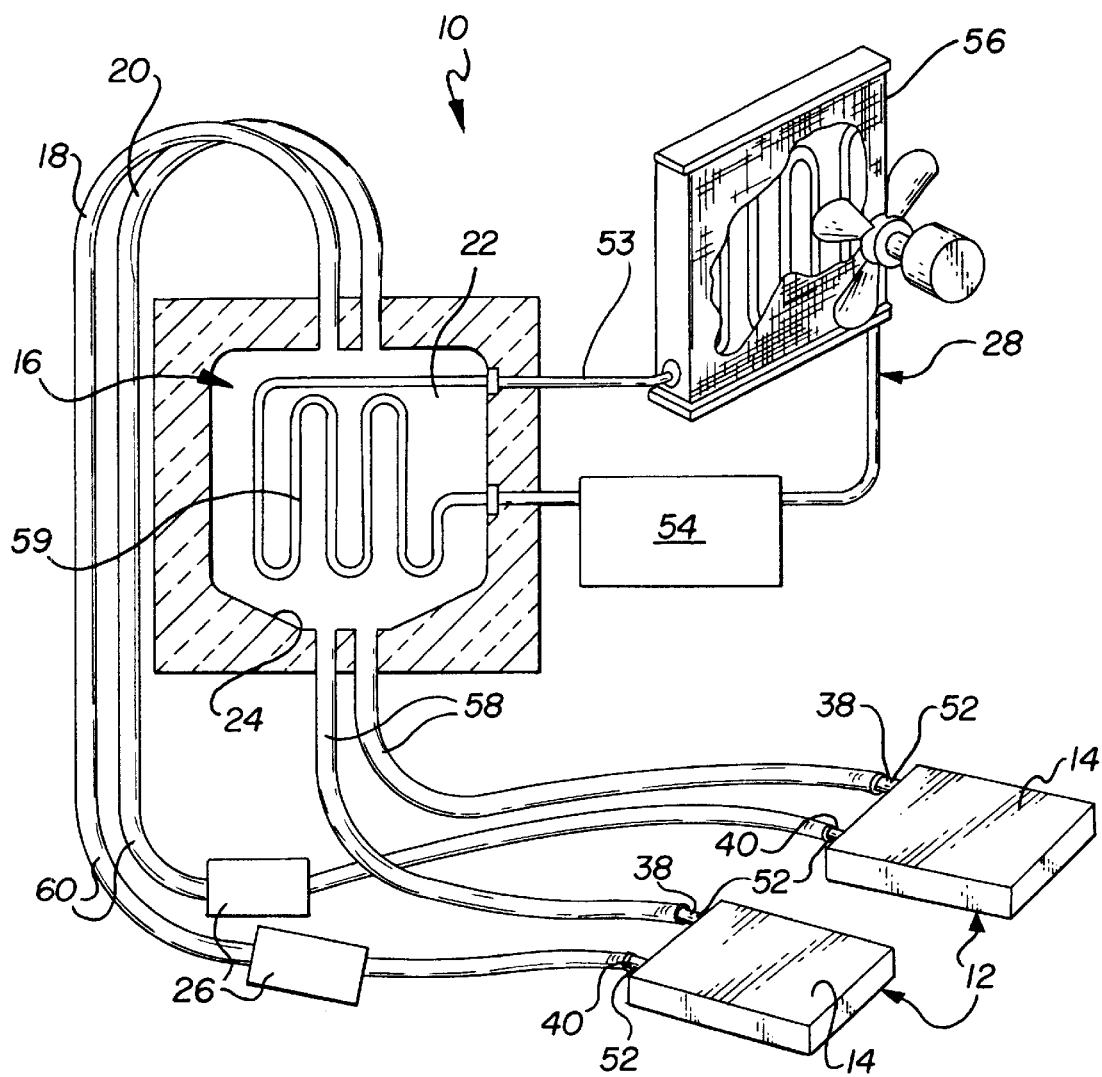
FIG. 4 is a diagrammatic view of an apparatus constructed according to the present invention.

An apparatus for removing heat energy from a piece to be worked, i.e., a work piece, is shown at 10 in FIG. 4. The apparatus 10 includes two copper plate support members generally indicated at 12 in FIG. 4. A representative one of the plates is generally indicated at 12 in FIGS. 1, 2 and 3. Work pieces (not shown) may be removably attached to an upper work piece support surface 14 of each copper plate 12 to support the work pieces as they are being ground, cut or otherwise formed by a tool. Work pieces may be attached to the support surfaces 14 by any suitable means to include bolting and clamping.

A fluid passageway 16, generally indicated at 16 in FIGS. 1–4, is disposed adjacent each work piece support surface 14. The fluid passageway 16 includes two separate circuits shown at 18 and 20, respectively, in FIG. 4. The two circuits 18, 20 intersect at a common fluid junction shown at 22 in FIG. 4. The fluid junction 22 is located within an insulated reservoir shown at 24 in FIG. 4. A fluid, such as antifreeze, substantially fills the reservoir 24 at the fluid junction 22 and also substantially fills both circuits 18, 20 of the fluid passageway 16. A fluid "propeller" or pump 26 is disposed in each circuit 18, 20 of the fluid passageway 16. Each pump 26 is in operative engagement with the fluid to move the fluid through the passageway 16. Any suitable pump may be used for this purpose.

A cooler, generally indicated at 28 in FIG. 4, is disposed adjacent the reservoir 24 portion of the fluid passageway 16. The cooler 28 is in thermal communication with the fluid and removes heat energy from the fluid as the pump 26 circulates the fluid through the two circuits 18, 20.

The fluid passageway 16 also includes a channel 30 disposed within each plate 12 adjacent the work piece support surfaces 14. The channels are representatively indicated at 30 in FIGS. 2 and 3. Each channel 30 is a void formed within a plate 12. Each channel 30 directs the fluid through its respective plate 12 and adjacent the work pieces attached to the respective support surfaces 14. In other words, heat energy flows from the work pieces into the plates 12 by conduction and is carried by convection from the plates 12 by the fluid flowing through the channels 30.

Figure 2:
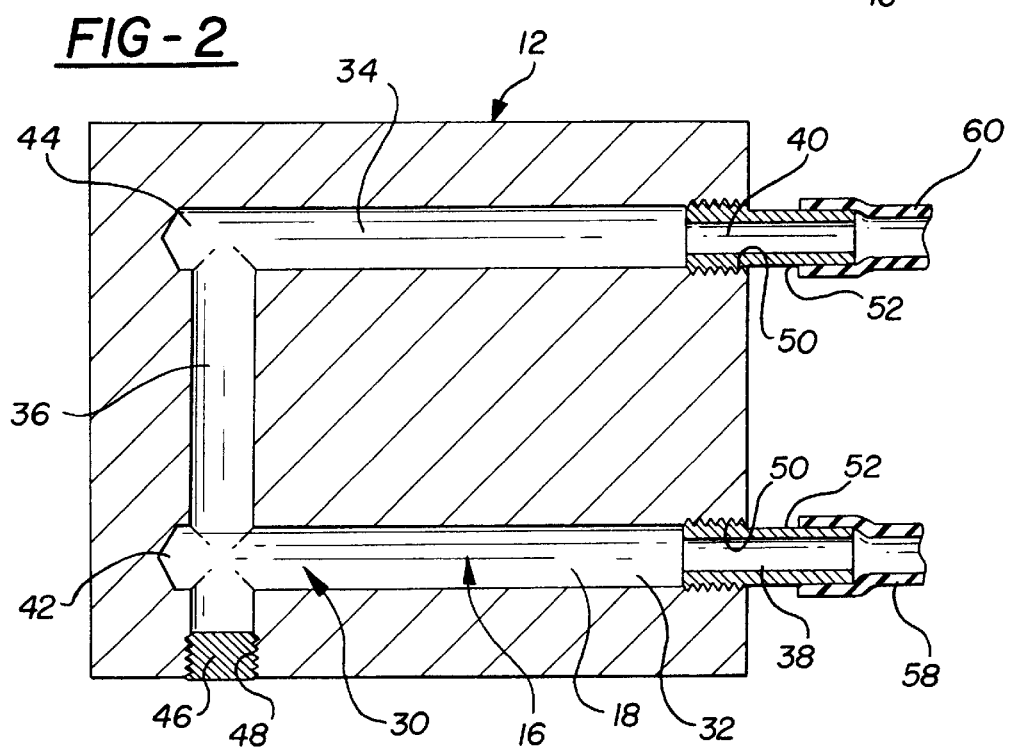
FIG. 2 is a cross-sectional view of the plate of FIG. 1 taken along line 2—2 of FIG. 1.

As is representatively shown in FIG. 2, the channel 30 within each plate 12 comprises three intersecting bores 32, 34, 36. Two of the bores 32, 34 are parallel to one another and form intake 38 and outlet 40 ports, respectively. The third bore 36 crosses and intersects the first two bores 32, 34 at inner ends 42, 44 of the first two bores 32, 34. The third bore 36 is sealed with a threaded plug 46. The threaded plug 46 engages threads 48 formed in an outer end of the third bore 36. The three intersecting bores 32, 34, 36 form a U-shape within the plate 12.

Figure 1:
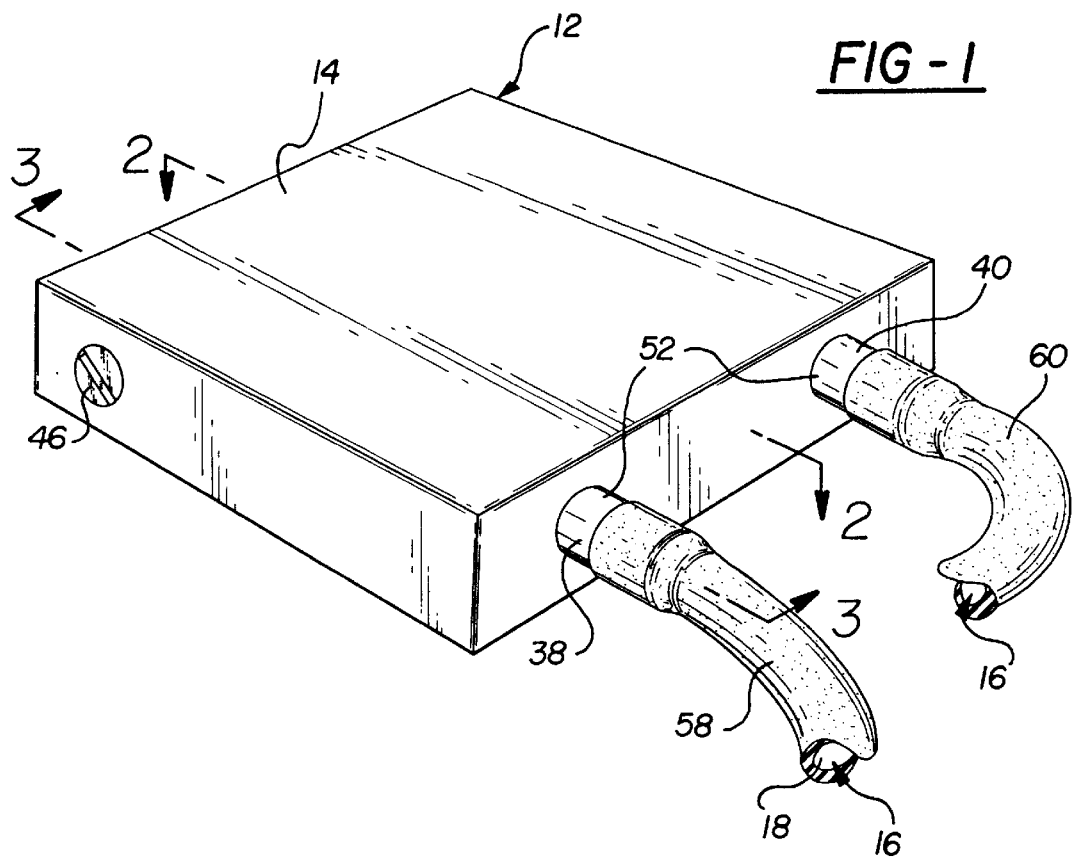
FIG. 1 is a perspective view of a work piece support plate constructed according to the present invention.

As shown in FIG. 1, each plate 12 comprises a solid copper block having the shape of a rectangular prism. The dimensions of each plate 12 are approximately 6"×4"×1". Each U-shaped channel 30 extends through its respective plate 12 between the fluid inlet port 38 and the fluid outlet port 40 and provides a fluid passage between the inlet 38 and outlet 40 ports. As shown in FIGS. 2 and 3, interior walls of the inlet port 38 and outlet port 40 interior walls include threads 50 to receive hose adapter tubes 52 in threaded engagement.

Referring again to FIG. 4, each of the two fluid circuits 18, 20 comprises a fluid delivery hose 58 connected between the cooler 28 and the intake port 38 and a fluid return hose 60 connected between the fluid outlet port 40 and the cooler 28. At the plate 12, the hoses 58, 60 are force-fit over the respective hose adapter tubes 52. The fluid propeller pumps 26 cause the fluid to circulate through the circuits 18, 20.

The cooler 28 shown in FIG. 4 includes a sealed fluid course 53 that contains a refrigerant, such as R-12, R-134a or a xeotropic refrigerant such as R-406a or CHG-X4. A compressor 54 compresses the refrigerant before sending it through a condenser 56. From the condenser 56 the coolant passes through a heat exchanger tube 59 immersed in the fluid in the reservoir 24. However, the cooler 28 may comprise any one of a number of other well-known refrigeration systems capable of removing heat energy from the fluid that circulates through the plates 12.

In other embodiments, the plates 12 may be made from one or more suitable heat conducting materials other than copper and may have any physical size and configuration suitable for holding and transferring heat from a work piece. Other embodiments may also include only one copper plate 12 or may include more than two copper plates 12. Single-plate embodiments would include only a single circuit while multiple-plate systems would include one circuit for each plate 12.

In practice, at least one work piece is fastened onto the work piece support surface 14 of each plate 12. The pump 26 and cooler 28 are then activated to provide a continuous flow of cold antifreeze to the channels 30 that pass through each plate 12.

The description and drawings illustratively set forth our presently preferred invention embodiments. We intend the description and drawings to describe these embodiments and not to limit the scope of the invention. Obviously, it is possible to modify these embodiments while remaining within the scope of the following claims. Therefore, within the scope of the claims, one may practice the invention otherwise than as the description and drawings specifically show and describe.

I claim:

1. An apparatus for removing heat energy from a work piece while forming the work piece by grinding, drilling, cutting or the like, said apparatus comprising:

a support member having a work piece support surface to hold a work piece, the support member being configured to fasten the work piece onto the support surface in a position for the work piece to be machined by a tool comprising a cutting element that forms the workpiece by removing fragments of material from the workpiece;

a fluid passageway disposed adjacent said work piece support surface;

a fluid disposed in said fluid passageway;

a fluid propeller disposed adjacent said passageway and in operative engagement with said fluid to move said fluid through said passageway;

a cooler disposed adjacent said fluid passageway and in thermal communication with said fluid to remove heat energy from said fluid;

said fluid passageway including a channel disposed within said support member adjacent said work piece support surface to direct said fluid through said support member and adjacent said work piece to transfer heat energy from said support member into said fluid by convection and to transfer heat energy into said support member from a work piece fixed to said work piece support surface by conduction whereby fragments cut from the workpiece are prevented from contaminating the fluid.

2. An apparatus as defined in claim 1 in which said support member comprises a metal plate having a fluid inlet port and a fluid outlet port, said channel extending through said plate between said fluid inlet port and said fluid outlet port.

3. An apparatus as defined in claim 2 in which said channel is defined by a void formed within said plate.

4. An apparatus as defined in claim 3 in which said void comprises intersecting bores.

5. An apparatus as-defined in claim 3 in which said plate comprises a copper block.

6. An apparatus as defined in claim 1 in which said fluid passageway forms a circuit and in which said fluid propeller causes said fluid to circulate through said circuit.

7. An apparatus as defined in claim 6 in which said fluid circuit comprises a fluid delivery hose connected between said cooler and said intake port and a fluid return hose connected between said fluid outlet port and said cooler.

8. An apparatus as defined in claim 1 in which said fluid comprises anti-freeze.

9. An apparatus as defined in claim 1 comprising at least one additional support member, each said additional support member including a work piece support surface to hold at least one additional work piece, and a channel disposed adjacent each said additional work piece support surface, each said channel in fluid communication with a fluid junction disposed adjacent and in thermal communication with said cooler.

10. An apparatus as defined in claim 9 in which said fluid passageway comprises at least one additional circuit for each additional support member, and each said additional support member is in fluid communication with said fluid junction through one of said additional fluid circuits.

11. A method for removing thermal energy from a work piece while forming the work piece by grinding, drilling, cutting or the like; the method comprising the steps of:

providing an apparatus comprising a support member having a work piece support surface, the support member being configured to fasten the work piece onto the support surface in a position for the work piece to be machined by a tool comprising a cutting element that forms the workpiece by removing fragments of material from the workpiece;

providing a fluid passageway adjacent the work piece support surface;

providing a fluid in the passageway;

providing a fluid channel portion of the fluid passageway in the support member adjacent the work piece support surface;

supporting a work piece on the work piece support surface of the support member;

providing a fluid propeller adjacent the passageway and in operative engagement with the fluid to move the fluid through the channel;

providing a cooler adjacent the passageway and in thermal communication with the fluid to remove thermal energy from the fluid;

circulating the fluid through the fluid passageway by actuating the fluid propeller; and forming the workpiece by removing fragments of material from the workpiece.

12. A method for removing thermal energy from more than one work piece at a time while forming the work piece by grinding, drilling, cutting or the like; the method comprising the steps of:

providing an apparatus comprising more than one support member, each support member having a work piece support surface, each support member being configured to fasten a work piece onto the support surface in a position for the work piece to be machined by a tool comprising a cutting element that forms the workpiece by removing fragments of material from the workpiece;

providing a fluid passageway adjacent each work piece support surface;

providing a fluid in the passageway; providing a fluid channel portion of the fluid passageway in each support member adjacent each work piece support surface;

supporting a work piece on the work piece support surface of each support member;

providing a fluid propeller adjacent the passageway and in operative engagement with the fluid to move the fluid through at least one of the channels;

providing a cooler in thermal communication with the fluid to remove thermal energy from the fluid;

circulating the fluid through the fluid passageway by actuating the fluid propeller; and forming the workpiece by removing fragments of material from the workpiece.

* * * * *